United States Patent
Tousignant et al.

(10) Patent No.: US 10,328,905 B2
(45) Date of Patent: Jun. 25, 2019

(54) WASH PUMP CONTROL BASED ON PREDICTED WIPER ARM POSITION USING HOOD MOUNTED SPRAY NOZZLES

(71) Applicant: Valeo North America, Inc., Troy, MI (US)

(72) Inventors: Alan Tousignant, Clinton Township, MI (US); Mark Pattison, Farmington Hills, MI (US); Charles Prain, Oxford, MI (US)

(73) Assignee: Valeo North America, Inc., Troy, MI (US)

( * ) Notice: Subject to any disclaimer, the term of this patent is extended or adjusted under 35 U.S.C. 154(b) by 447 days.

(21) Appl. No.: 14/724,949

(22) Filed: May 29, 2015

(65) Prior Publication Data

US 2016/0347287 A1    Dec. 1, 2016

(51) Int. Cl.
*B60S 1/52*    (2006.01)
*B60S 1/48*    (2006.01)
*B60S 1/08*    (2006.01)

(52) U.S. Cl.
CPC .............. *B60S 1/483* (2013.01); *B60S 1/0814* (2013.01); *B60S 1/482* (2013.01); *B60S 1/486* (2013.01); *B60S 1/52* (2013.01); *B60S 1/524* (2013.01)

(58) Field of Classification Search
CPC ............... B60S 1/48; B60S 1/52; B60S 1/482
See application file for complete search history.

(56) References Cited

U.S. PATENT DOCUMENTS

| 6,144,906 A | * | 11/2000 | Buchanan, Jr. | ....... | B60S 1/0807 307/9.1 |
| 2013/0032169 A1 | | 2/2013 | Calluiere et al. | | |
| 2015/0030462 A1 | * | 1/2015 | Boekenkamp | ......... | B60S 1/485 417/14 |

FOREIGN PATENT DOCUMENTS

DE    19653432 A1    6/1997

OTHER PUBLICATIONS

Patent Translation of DE19653432 by S. Ahn et al. to English.*
Notification of Transmittal of the International Search Report and the Written Opinion of the International Searching Authority issued in corresponding International Application No. PCT/US2016/029957, dated Sep. 16, 2016 (23 pages).

* cited by examiner

*Primary Examiner* — Michael D Jennings
(74) *Attorney, Agent, or Firm* — Osha Liang LLP

(57) ABSTRACT

A windshield window wiping system, including a wiper blade in contact with a windshield window; a wiper motor operatively connected to the wiper blade, configured to perform a wiper blade stroke; a reservoir for a wash fluid; a first hood mounted nozzle, configured to project the wash fluid toward the windshield window; a wash pump, wherein the wash pump is hydraulically connected to the first hood mounted nozzle; and a first electronic circuit, configured to estimate a position of the wiper blade during the wiper blade stroke based on an input to the first electronic circuit and to synchronize the projection of the wash fluid toward the windshield window with the estimated position of the wiper blade. In other aspects, a method of wiping a windshield window and a non-transitory computer readable medium are provided.

12 Claims, 9 Drawing Sheets

| T1 = Up Wash ON |||||||
|---|---|---|---|---|---|---|
| | Low ||| High |||
| Volt\MPH | 0 | 70 | 100 | 0 | 70 | 100 |
| 9 | 10 | 8 | 5 | 8 | 5 | 0 |
| 10 | 10 | 8 | 5 | 8 | 5 | 0 |
| 11 | 9 | 7 | 3 | 7 | 3 | 0 |
| 12 | 9 | 7 | 3 | 7 | 3 | 0 |
| 13 | 9 | 7 | 3 | 7 | 3 | 0 |
| 14 | 8 | 6 | 1 | 6 | 1 | 0 |
| 15 | 8 | 6 | 1 | 6 | 1 | 0 |
| 16 | 8 | 6 | 1 | 6 | 1 | 0 |

FIG. 11a

| T2 = Up Wash OFF |||||||
|---|---|---|---|---|---|---|
| | Low ||| High |||
| Volt\MPH | 0 | 70 | 100 | 0 | 70 | 100 |
| 9 | 610 | 533 | 480 | 328 | 250 | 195 |
| 10 | 600 | 523 | 470 | 318 | 240 | 185 |
| 11 | 589 | 512 | 458 | 307 | 228 | 175 |
| 12 | 579 | 502 | 448 | 297 | 218 | 165 |
| 13 | 569 | 492 | 438 | 287 | 208 | 155 |
| 14 | 558 | 481 | 426 | 276 | 196 | 145 |
| 15 | 548 | 471 | 416 | 266 | 186 | 135 |
| 16 | 538 | 461 | 406 | 256 | 176 | 125 |

FIG. 11b

| T3 = Down Wash ON |||||||
|---|---|---|---|---|---|---|
| | Low ||| High |||
| Volt\MPH | 0 | 70 | 100 | 0 | 70 | 100 |
| 9 | 825 | 787 | 762 | 575 | 537 | 512 |
| 10 | 800 | 762 | 737 | 550 | 512 | 487 |
| 11 | 775 | 737 | 712 | 525 | 487 | 462 |
| 12 | 750 | 712 | 687 | 500 | 462 | 437 |
| 13 | 725 | 687 | 662 | 475 | 437 | 412 |
| 14 | 700 | 662 | 637 | 450 | 412 | 387 |
| 15 | 675 | 637 | 612 | 425 | 387 | 362 |
| 16 | 650 | 612 | 587 | 400 | 362 | 337 |

FIG. 11c

| T4 = Down Wash OFF |||||||
|---|---|---|---|---|---|---|
| | Low ||| High |||
| Volt\MPH | 0 | 70 | 100 | 0 | 70 | 100 |
| 9 | 1550 | 1475 | 1425 | 1050 | 975 | 925 |
| 10 | 1500 | 1425 | 1375 | 1000 | 925 | 875 |
| 11 | 1450 | 1375 | 1325 | 950 | 875 | 825 |
| 12 | 1400 | 1325 | 1275 | 900 | 825 | 775 |
| 13 | 1350 | 1275 | 1225 | 850 | 775 | 725 |
| 14 | 1300 | 1225 | 1175 | 800 | 725 | 675 |
| 15 | 1250 | 1175 | 1125 | 750 | 675 | 625 |
| 16 | 1200 | 1125 | 1075 | 700 | 625 | 575 |

FIG. 11d

WASH PUMP CONTROL BASED ON PREDICTED WIPER ARM POSITION USING HOOD MOUNTED SPRAY NOZZLES

BACKGROUND

Windshield wipers are an important safety feature of modern vehicles and are used to remove rain and vision obstructing dust from the windshields of automobiles, trains, ships, and airplanes. In order to effectively remove dust from the windshield, a windshield wiper fluid is projected toward the windshield to be cleaned. Such windshield wiper fluid may contain, for example, water, alcohol, detergent, among other constituents. The volume ratio of the individual windshield wiper fluid constituents may be chosen such as to prevent freezing of the vehicle windshield wiper fluid in the climate of intended vehicle use. A reservoir may hold a sufficient amount of windshield wiper fluid to allow the vehicle to be safely operated for extended periods between refilling the reservoir.

The actual implementation and features of a windshield wiping system in a vehicle are driven by several considerations. One of these considerations is how effectively the windshield wiper fluid is being used during the wiping of the windshield. For example, projecting the windshield wiper fluid toward the windshield far in advance of the windshield wiper action may result in partial or complete runoff of the windshield wiper fluid from the windshield without being utilized during the windshield wiper cleaning action. Further, the distribution of the projected windshield wiper fluid on the windshield may also play a role in how effective the windshield wiper fluid is being used. For example, concentrating the projected windshield wiper fluid on a single spot of the windshield may lead to local excess of windshield wiper fluid on the windshield and may result in runoff of only partially utilized windshield wiper fluid. However, runoff of unused or underutilized windshield wiper fluid should be minimized from an environmental perspective.

Another consideration is the cost-effectiveness of the windshield wiping system in a vehicle and the competitive pricing situation in the overall market. On the one hand, although a windshield wiping system may be highly accurate, reliable, and effective, the actual implementation in a vehicle on the other hand may be prohibitive from a cost perspective. A suitable tradeoff may have to be found that allows several of the above considerations to be simultaneously satisfied to yield an acceptable outcome. In that respect, it may be beneficial to explore how additional elements of a windshield wiping system may be advantageously combined with vehicle elements to minimize cost.

SUMMARY

In general, in one aspect, one or more embodiments disclosed herein relate to a windshield window wiping system, including a wiper blade in contact with a windshield window; a wiper motor operatively connected to the wiper blade, configured to perform a wiper blade stroke; a reservoir for a wash fluid; a first hood mounted nozzle, configured to project the wash fluid toward the windshield window; a wash pump, wherein the wash pump is hydraulically connected to the first hood mounted nozzle; and a first electronic circuit, configured to estimate a position of the wiper blade during the wiper blade stroke based on an input to the first electronic circuit and to synchronize the projection of the wash fluid toward the windshield window with the estimated position of the wiper blade.

In another aspect, one or more embodiments disclosed herein relate to a method of wiping a windshield window, including operatively connecting a wiper motor to a wiper blade; bringing the wiper blade in contact with a windshield window; estimating a position of the wiper blade during a wiper blade stroke across the windshield window; projecting a wash fluid toward the windshield window through a first hood mounted nozzle; and synchronizing the projection of wash fluid toward the windshield window with the estimated position of the wiper blade.

In yet another aspect, one or more embodiments disclosed herein relate to a non-transitory computer readable medium comprising instructions, which, when executed by a processor, cause the processor to perform a wiper blade stroke across the windshield window; estimate a position of the wiper blade during the wiper blade stroke; project a wash fluid toward the windshield window through a hood mounted nozzle; and synchronize the projection of the wash fluid toward the windshield window with the estimated position of the wiper blade.

Other aspects of the disclosure will be apparent from the following description and the appended claims.

BRIEF DESCRIPTION OF DRAWINGS

FIGS. 11a, 11b, 11c, and 11d show the assigned values of the wash pump timings T1, T2, T3, and T4 in FIGS. 9 and 10 in dependency of the wiper motor supply voltage, vehicle speed, and wiper motor speed, in accordance with one or more embodiments.

DETAILED DESCRIPTION

Figure 1:
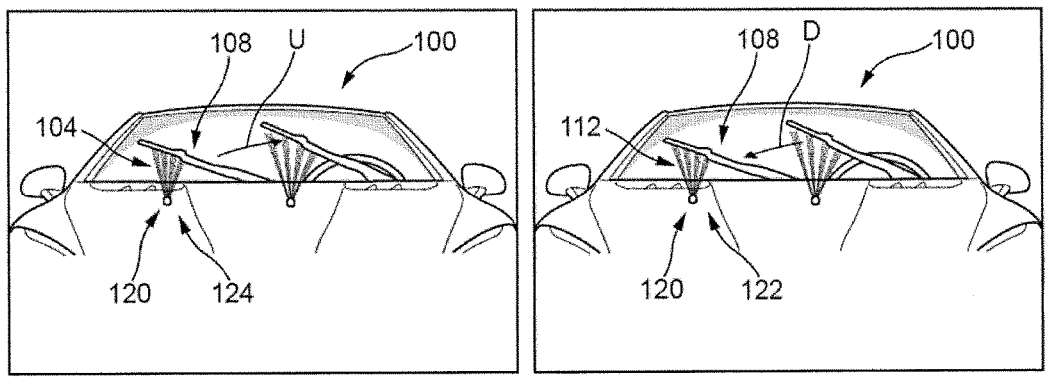
FIG. 1 shows a windshield window wiping system for a front window of an automotive vehicle in accordance with one or more embodiments.

Specific embodiments will now be described in detail with reference to the accompanying figures. Like elements in the various figures may be denoted by like names and/or like reference numerals for consistency.

In the following detailed description of embodiments of the disclosure, numerous specific details are set forth in order to provide a more thorough understanding of the disclosure. However, it will be apparent to one of ordinary skill in the art that embodiments may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create a particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the present disclosure relate to cost-effective windshield window wiping of vehicles. Such cost-effectiveness may be achieved by estimating the location of the wiper blade during the windshield window wiping and synchronizing the projection of wash fluid with the estimated wiper blade position. In addition, cost-effectiveness may be achieved by smartly co-locating or combining the additionally required elements with vehicle elements. In one or more embodiments, windshield window wiping may be applied to automotive vehicles. In other embodiments, windshield window wiping may be applied to trains, ships, and airplanes. However, the present disclosure is not limited to these embodiments and the windshield window wiping may be applied to other situations that require wiping of windows. Further, the windshield window wiping is not limited to the front windshield window of a vehicle but may be any window (front, rear, side, top) of a vehicle. In addition, the present disclosure may also extend to any window of a non-vehicular structure that requires wiping of windows. Moreover, the present disclosure may also extend to any general non-windowed surfaces that require wiping.

Throughout the disclosure, certain specific terms will be used to describe elements or functionality of one or more embodiments. However, other terms may be likewise used to describe the same elements or functionality of one or more embodiments. For example, the term "windshield window wiping" may also be referred to as "windshield wiping" or "window wiping" or just "wiping action." Similarly, the term "windshield window wiper fluid" may also be referred to as "windshield wiper fluid", "wiper fluid", "wash fluid", or just "fluid." Further, "activating/controlling a wash pump motor of a wash pump" may be referred to as "activating/controlling a wash pump."

FIG. 1 shows a windshield window wiping system for a front window of an automotive vehicle in accordance with one or more embodiments. In FIG. 1, element 100 depicts an automotive vehicle on which a windshield window wiping system has been installed. Specifically, FIG. 1 shows a pair of windshield window wipers in contact with a windshield window during an "Up Stroke" illustrated by arrow U and a "Down Stroke," illustrated by arrow D. Further, FIG. 1 shows a pair of hood mounted nozzles. While the automotive vehicle in FIG. 1 is shown with a pair of windshield window wipers and a pair of hood mounted nozzles, for simplicity only the passenger side windshield window wiper of the windshield window wiper pair is labeled with element 108 and discussed below. In addition, only the passenger side hood mounted nozzle of the pair of hood mounted nozzles is labeled with elements 120, 122, and 124, and discussed below. Further, for simplicity the operative connection of the wiper blade 108 to a wiper motor is not shown in FIG. 1. However, one of ordinary skill in the art would appreciate and understand that the wiper motor is operatively connected to the wiper blade in order to perform a wiper blade up stroke and a wiper blade down stroke. In addition, a reservoir for the wiper fluid as well as a wash pump to project the wiper fluid toward the windshield window is not shown in FIG. 1.

The windshield window wiper blade in FIG. 1 has two longitudinal edges. The longitudinal edge that is furthest advanced in the direction of the up stroke is also referred to as leading edge of the wiper blade. In contrast, the trailing edge is the longitudinal edge of the wiper blade which is substantially parallel to the leading edge and follows its movement during the up stroke. During the down stroke, the situation is reversed and the longitudinal edge that was the leading edge during the up stroke becomes the trailing edge. Similarly, during the down stroke, the longitudinal edge that was the trailing edge during the up stroke becomes the leading edge. In essence, the leading edge is the longitudinal edge that is the furthest advanced in the direction of the wiper blade movement.

Element 108 shows the passenger side windshield window wiper blade during the up stroke. Specifically, FIG. 1 illustrates that during the up stroke, the windshield window wiper fluid 104 is projected from a first nozzle 124 of the passenger side hood mount 120 toward the windshield window in front of the leading wiper blade edge. The first nozzle 124 of the passenger side hood mount 120 in turn is hydraulically connected to a wash pump (not shown in FIG. 1). Similarly, during the down stroke, the windshield window wiper fluid 112 is projected from a second nozzle 122 of the passenger side hood mount 120 toward the windshield window in front of the leading wiper blade edge. The second nozzle 122 of the passenger side hood mount 120 in turn is hydraulically connected to a wash pump (not shown in FIG. 1). During a windshield window wiping the up stroke and the down stroke may be repeated successively. Consequently, the projection of windshield window wiper fluid from the first and second nozzles of the passenger side hood mount 120 occur also successively in synchronization with the wiper blade strokes. The electronic circuit required to achieve this synchronization is discussed further below and is not shown in FIG. 1.

Although FIG. 1 has been discussed in the context of a first and second nozzles of the passenger side hood mount 120, one of ordinary skill in the art would know and appreciate that other embodiments of the windshield window wiping system may utilize only a first nozzle in the passenger side hood mount. Specifically, the use of only the first nozzle in the passenger side hood mount may require only a single wash pump while the utilization of a first and a second nozzle in the passenger side hood mount may necessitate a reverse wash pump, a second wash pump, or additional valves. In one or more embodiments, only a first nozzle in the passenger side hood mount projects a wash fluid toward the windshield window only during the up stroke or only during the down stroke of the windshield wiper. Further, other embodiments may utilize other geometric openings to project the wash fluid toward the windshield window. For example, one or more embodiments may utilize holes or rectangular openings such as openings in the form of a slit.

Further, although FIG. 1 is shown with a pair of wiper blades and a pair of hood mounted nozzles, other embodiments may utilize only a single wiper blade and a single hood mounted nozzle, which may include a first nozzle and a second nozzle, or alternatively only a first nozzle. In yet other embodiments, more than two wiper blades may be used. In one or more embodiments, the wiper blade may rotate around a pivot axis. In other embodiments, the wiper blade may be offset from a pivot axis. In yet further embodiments the offset from the pivot axis may not be constant across the up stroke or the down stroke. In yet other embodiments, the wiper blades may move in opposite directions from each other. In other embodiments, the first and/or second nozzle may be of different size on the driver side and the passenger side. In yet other embodiments, a shape and a wash fluid distribution of the first and/or second nozzle may be different on the driver side and the passenger side. Further, in additional embodiments, a shape and a wiping angle of the wiper blade may be different on the driver side and the passenger side. Yet other embodiments (not shown) may utilize several hood mounts on the driver side and several hood mounts on the passenger side, which may include a single nozzle or first and second nozzles. However, one of ordinary skill in the art would know and appreciate that the present disclosure is not limited to the above-described geometric arrangements and that the windshield window wiping system can be applied to any wiper arrangement. Further, one of ordinary skill in the art would know and appreciate that driver side and passenger side may be switched dependent on a target market.

In addition, while FIG. 1 has been described with a projection of the windshield window wiper fluid 104 toward the windshield window during the up stroke and another projection of the windshield window wiper fluid 112 toward the windshield window during the down stroke, the present disclosure is not limited to these embodiments. Other embodiments may utilize multiple projections of windshield window wiper fluid toward the windshield window during both, the up stroke and the down stroke. Alternatively, in yet other embodiments there may be multiple projections of windshield wiper fluid toward the windshield window only during the up stroke or only during the down stroke. Yet other embodiments may optimize the windshield wiper fluid toward the windshield window using different fluid pressure during a single projection or using different fluid pressure during multiple projections. In yet other embodiments, the windshield wiper fluid pressure for a projection of wiper fluid toward the windshield window may vary with vehicle speed.

Figure 2:
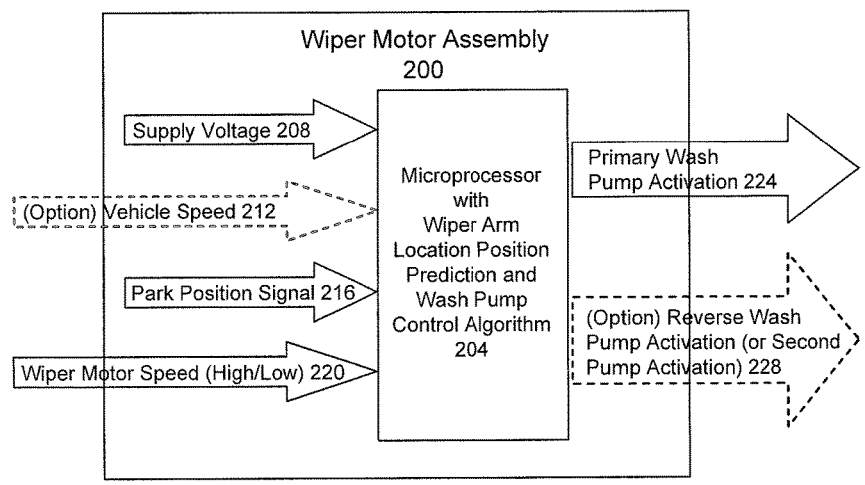
FIG. 2 shows inputs to and outputs from a microprocessor of a windshield window wiping system in a wiper motor assembly in accordance with one or more embodiments.

Referring now to FIG. 2, FIG. 2 illustrates inputs to and outputs from a microprocessor 204 of a windshield window wiping system in accordance with one or more embodiments. The microprocessor 204 may be a part of a first electronic circuit. In the embodiment in FIG. 2, the microprocessor 204 is located in a wiper motor assembly 200. The microprocessor 204 is configured to execute a wiper arm location position prediction and wash pump control algorithm. In one or more embodiments, a measure of the supply voltage 208 to the wiper motor may be an input to the microprocessor 204. Further, one of ordinary skill in the art knows and appreciates that the supply voltage 208 to the wiper motor and to other components in the vehicle may vary substantially, particularly in a case where the supply voltage 208 is not regulated. One of ordinary skill in the art also knows and appreciates that only some components in the vehicle may receive a regulated supply voltage while others may receive an unregulated supply voltage.

In other embodiments, the vehicle speed 212 may be an input to the microprocessor 204. In further embodiments, a park position signal 216 may be an input to the microprocessor 204. The park position signal 216 may be a reference signal for a known position of the wiper blade, provided by a wiper motor switch. For example, in some embodiments, the wiper motor switch may be an internal wiper motor limit switch which may be closed in the park position of the wiper blade. The park position of the wiper blade may also be referred to as in-wipe (IW) position. In other embodiments, the wiper motor limit switch may be closed at the other limit, i.e., at the maximum up stroke position, which is also referred to as the out-wipe (OW) position of the wiper blade. In yet other embodiments, the wiper motor switch which provides a reference signal to the microprocessor 204 may be closed at the center of the up stroke/down stroke of the wiper blade.

One of ordinary skill in the art would know and appreciate that the present disclosure is not limited to the described internal wiper motor limit switch and other embodiments may utilize a different reference signal as input to the microprocessor 204, to indicate a reference position of the wiper blade. For example, one or more embodiments may track a switching of the wiper motor poles to provide a reference signal or multiple reference signals to the microprocessor 204. Further embodiments may utilize various combinations of wiper motor supply voltage 208, vehicle speed 212, park position signal 216, and wiper motor speed 220 as inputs to the microprocessor 204. In addition, the vehicle speed input 212 may be replaced by a measurement of the wiper motor current. That is, at an increased vehicle speed, the mechanical loading on the wiper arm and wiper blade also increases and therefore the mechanical loading on the wiper motor increases as well. Thus, the wiper motor current measurement may replace the vehicle speed 212 as input to the microprocessor 204. The choice of appropriate inputs may be driven in part by how strongly the specific input affects the wiper motor speed and the cost-adder associated with each input.

In FIG. 2, the various inputs to the microprocessor 204 are indicated with arrows of different length. The start of the arrows of the supply voltage input 208 and park position signal input 216 are located inside the schematic box of the wiper motor assembly 200. In contrast, the start of the arrows of the vehicle speed input 212 and wiper motor speed input 220 are located outside the schematic box of the wiper motor assembly 200. Specifically, the start of the respective arrow indicates whether the specific input has to be provided from externally to the wiper motor assembly or whether it may be available from within the wiper motor assembly. One of ordinary skill in the art knows and appreciates that the cost-adder may be less in a case where the respective input is available from within the wiper motor assembly. With respect to FIG. 2, the supply voltage 208 and the park position signal 216 are available within the wiper motor assembly 200, while the vehicle speed 212 and the wiper motor speed 220 may have to be provided from externally to the wiper motor assembly.

In the embodiment in FIG. 2, an output of the microprocessor 204 may be a signal 224 to activate a primary wash pump. In one or more embodiments, the primary wash pump may be hydraulically connected to a first nozzle of a hood mount. In other embodiments, a further output of the microprocessor 204 may be a signal 228 to activate a second wash pump. In one or more embodiments, the second wash pump may be hydraulically connected to a second nozzle of the hood mount. In yet other embodiments, a reversible wash pump may be activated in forward or reverse. In one or more embodiments, the reversible wash pump may be connected in forward to the first nozzle of the hood mount, and in reverse to the second nozzle of the hood mount. In yet other embodiments, the microprocessor 204 may provide output to a wash pump and one or more valves, which are hydraulically connected to the first and second nozzles of the hood mount. As discussed above, the present disclosure is not limited to nozzles of a hood mount and other embodiments may utilize other geometric openings to project the wash fluid toward the windshield window. For example, one or more embodiments may utilize holes or rectangular openings such as openings in the form of a slit. Yet other embodiments may utilize shaped nozzles in lieu of holes.

Figure 3:
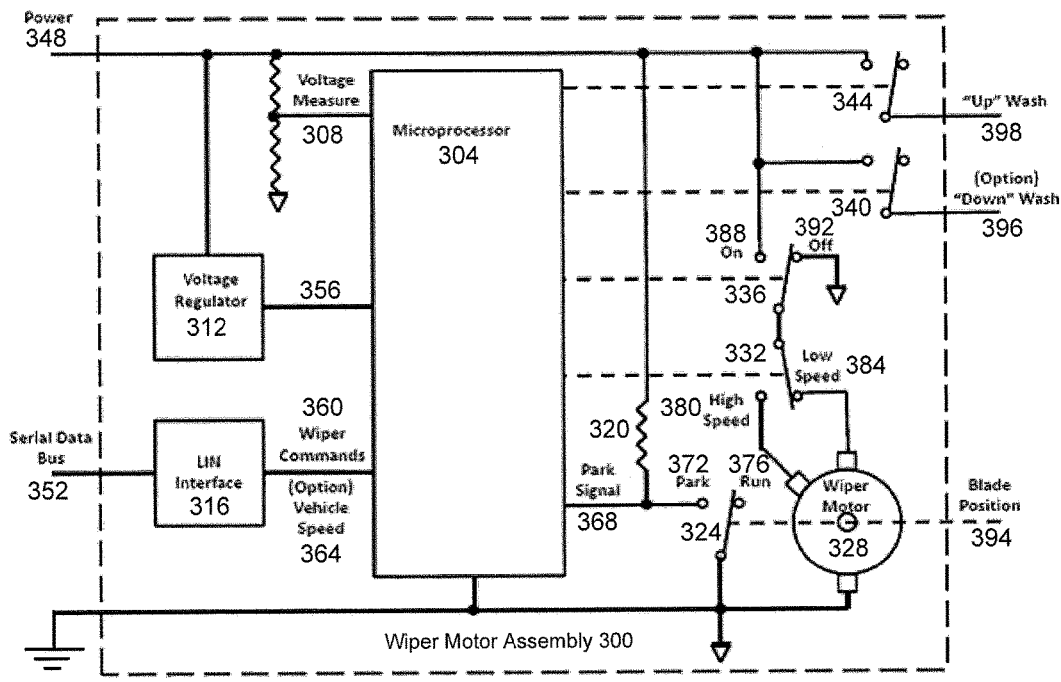
FIG. 3 shows an electronic circuit diagram of a windshield window wiping system in a wiper motor assembly in accordance with one or more embodiments.

FIG. 3 shows an electronic circuit diagram of a windshield window wiping system in a wiper motor assembly 300 corresponding to FIG. 2. In accordance with one or more embodiments, a microprocessor 304 is located within the wiper motor assembly 300. In FIG. 3, the microprocessor 304 is provided with a regulated voltage 356 of 5V from the voltage regulator 312. However, the present disclosure is not limited to a regulated voltage 356 of 5V and other embodiments may use regulated voltages lower or higher than 5V. In addition, several inputs are available to the microprocessor 304. One of these inputs is a voltage measure circuit 308, which measures the supply voltage. FIG. 3 also illustrates that the supply voltage 348 is also the voltage of the wiper motor 328. In one or more embodiments, the supply voltage 348 may be on the order of 13.5V. In other embodiments, the supply voltage 348 may be larger or smaller than 13.5V and may vary dependent on an alternator output voltage. Further, one of ordinary skill in the art knows and appreciates that the present disclosure is not limited to the particular voltage measure circuit 308 shown in FIG. 3. In one or more embodiments, the supply voltage 348 may be measured by a different voltage measure circuit.

Another input to the microprocessor 304 in FIG. 3 may be wiper commands 360 and the vehicle speed 364. The wiper commands 360 and the vehicle speed 364 may be provided to the microprocessor 304 by a local interconnect network (LIN) interface 316. The LIN interface 316 receives information from a serial data bus 352 and utilizes a serial network protocol for exchange of information between components. In FIG. 3, the wiper commands 360 provided by the LIN interface 316 to the microprocessor 304 may contain information whether the low speed or high speed wiper motor speed has been selected by the vehicle operator. Further, the wiper commands 360 may indicate whether the vehicle operator has selected to clean the windshield window. However, the present disclosure is not limited to a LIN interface 316. In one or more embodiments, the LIN interface 316 may be replaced with a controller area network (CAN) bus. In yet other embodiments, the LIN interface 316 may be replaced with a wireless transmission. In yet other embodiments, the LIN interface 316 may be replaced by hardwiring of inputs to the microprocessor 304.

A further input to the microprocessor 304 in FIG. 3 may be a park signal 368, also referred to as park position signal or as park signal input. As described above, the park position signal 368 may be a reference signal for a known position of the wiper blade, provided by a wiper motor switch 324. Specifically, a wiper motor 328 is shown in FIG. 3 and FIG. 3 further illustrates that the wiper blade position 394 affects the closure of a wiper motor switch 324. In FIG. 3, the wiper motor switch 324 is shown external to the wiper motor 328. In other embodiments, the wiper motor switch 324 may be internal to the wiper motor 328. In a case when the wiper motor switch 324 is in a "Park" position 372, the wiper blades are in the corresponding in-wipe (IW) position, which is also referred to as a known reference position of the wiper blades. In this case, a reference signal for the known position of the wiper blades is provided as input to the microprocessor 304. Specifically, the park signal input 368 to the microprocessor 304 is pulled to ground when the wiper motor switch 324 is in the "Park" position 372. In a case when the wiper motor switch 324 is in a "Run" position 376, the wiper blades are either in the up stroke, at the out-wipe (OW) position, or in the down stroke, but not in the IW position. In this case, the park signal input 368 to the microprocessor 304 is pulled "high" to the power supply voltage 348 via the pull-up resistor 320.

Still referring to FIG. 3, the microprocessor 304 may have several outputs. For example the microprocessor 304 may affect the position of the low speed/high speed switch 332 indicated by the dotted lines in FIG. 3. The low speed position of the low speed/high speed switch 332 in FIG. 3 is indicated by the numeral 384, while the high speed position is indicated by the numeral 380. In addition, the microprocessor 304 may affect the position of the On/Off switch 336. The On position of the On/Off switch 336 in FIG. 3 is indicated by the numeral 388, while the Off position is indicated by the numeral 392. Further, the microprocessor 304 may affect the position of a wash pump switch 344, which in turn activates power to a wash pump for the "Up Wash" 398. In one or more embodiments, the "Up Wash" refers to the projection of windshield wiper fluid toward the windshield window during the up stroke (i.e. projection through the up ramp). Similarly, in one or more embodiments, the "Down Wash" refers to the projection of windshield wiper fluid toward the windshield window during the down stroke (i.e. projection through the down ramp). FIG. 3 also illustrates that the microprocessor 304 may further affect the position of the switch 340, which in turn may activate power to another wash pump for the down wash 396. However, as described above, the present disclosure is not limited by these embodiments. Alternate embodiments as described above, may utilize only a single wash pump, a primary and a secondary wash pump, or a single wash pump with an added valve or valves. Further, other embodiments may utilize multiple projections of windshield window wiper fluid toward the windshield window during both, the up stroke and the down stroke. Alternatively, in yet other embodiments there may be multiple projections of windshield wiper fluid toward the windshield window only during the up stroke or only during the down stroke. Yet other embodiments may optimize the windshield wiper fluid toward the windshield window using different fluid pressure during a single projection or using different fluid pressure during multiple projections. In yet other embodiments, the windshield wiper fluid pressure for a projection of wiper fluid toward the windshield window may vary with vehicle speed.

Figure 4:
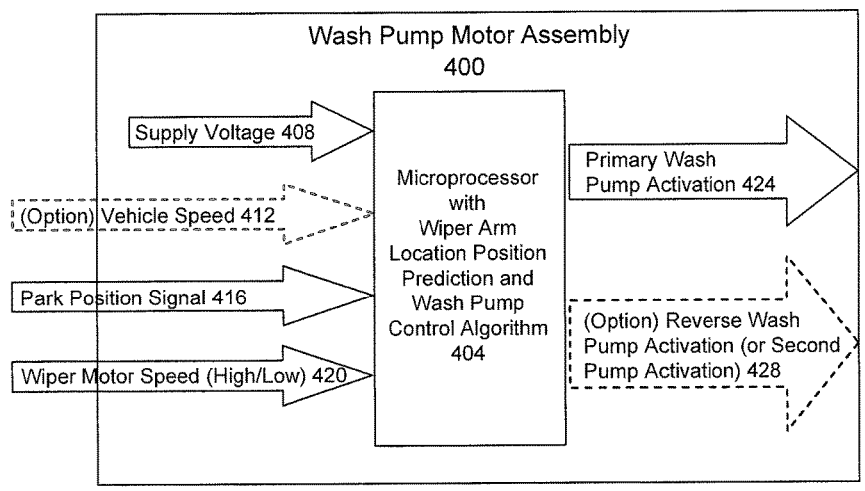
FIG. 4 shows inputs and outputs from a microprocessor of a windshield window wiping system in a wash pump motor assembly in accordance with one or more embodiments.

FIG. 4 illustrates inputs and outputs from a microprocessor 404 of a windshield window wiping system in a wash pump motor assembly 400 in accordance with one or more embodiments. For the sake of brevity, only the differences to FIG. 2 will be explained. However, all variations and alternate embodiments described with respect to FIG. 2 are also applicable to FIG. 4 as well. In FIG. 4, the microprocessor 404 may be a part of a first electronic circuit. In the embodiment in FIG. 4, the microprocessor 404 is located in a wash pump motor assembly 400. Placing the first electronic circuit into the wash pump motor assembly 400 may be advantageous from a cost-perspective because the supply voltage 408 of the wiper motor, which is essentially the supply voltage of the wash pump, is readily available inside the wash pump motor assembly 400. Other potential inputs to the microprocessor 404 may be combinations of vehicle speed 412, park position signal 416, and wiper motor speed 420, which may have to be provided from externally to the wash pump motor assembly. In the embodiment in FIG. 4, an output of the microprocessor 404 may be a signal 424 to activate a primary wash pump. In other embodiments, a further output of the microprocessor 404 may be a signal 428 to activate a second wash pump.

Figure 5:
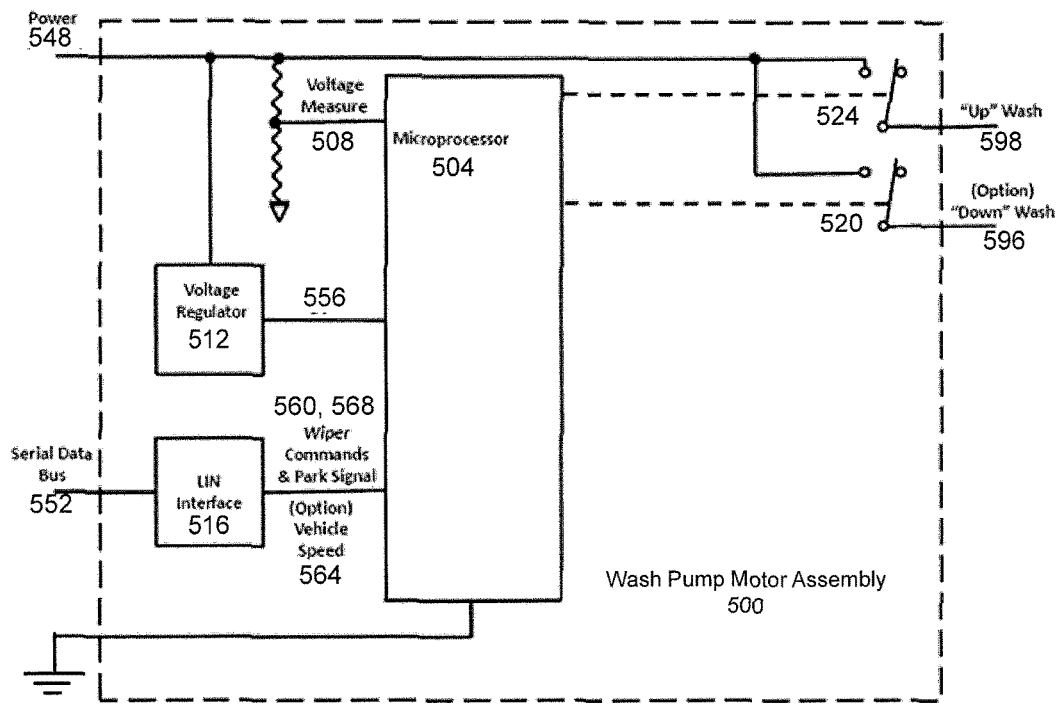
FIG. 5 shows an electronic circuit diagram of a windshield window wiping system in a wash pump motor assembly in accordance with one or more embodiments.

FIG. 5 shows an electronic circuit diagram of a windshield window wiping system in a wash pump motor assembly 500 corresponding to FIG. 4. In accordance with one or more embodiments, a microprocessor 504 is located within the wiper motor assembly 500 indicated by a dotted line. For the sake of brevity, only the differences to FIG. 3 will be explained. However, all variations and alternate embodiments described with respect to FIG. 3 are also applicable to FIG. 5 as well. In FIG. 5, the microprocessor 504 may be a part of a first electronic circuit. In contrast to FIG. 3, FIG. 5 does not show the wiper motor, low speed/high speed switch, and On/Off switch, because in the embodiment in FIG. 5, these components are located outside the wash pump motor assembly 500. However, FIG. 5 indicates that a LIN interface 516 provides the park signal input to the microprocessor 504 along with the previously described wiper commands and vehicle speed input.

In FIG. 5, the microprocessor 504 is provided with a regulated voltage 556 of 5V from the voltage regulator 512. However, the present disclosure is not limited to a regulated voltage 556 of 5V and other embodiments may use regulated voltages lower or higher than 5V. In addition, several inputs are available to the microprocessor 504. One of these inputs is a voltage measure circuit 508, which measures the supply voltage. In one or more embodiments, the supply voltage 548 may be on the order of 13.5V. In other embodiments, the supply voltage 548 may be larger or smaller than 13.5V and may vary dependent on an alternator output voltage. Further, one of ordinary skill in the art knows and appreciates that the present disclosure is not limited to the particular voltage measure circuit 508 shown in FIG. 5. In one or more embodiments, the supply voltage 548 may be measured by a different voltage measure circuit.

Another input to the microprocessor 504 in FIG. 5 may be wiper commands 560, the park signal 568, and the vehicle speed 564. The wiper commands 560, the park signal 568, and the vehicle speed 564 may be provided to the microprocessor 354 by a local interconnect network (LIN) interface 516. The LIN interface 516 receives information from a serial data bus 552 and utilizes a serial network protocol for exchange of information between components. In FIG. 5, the wiper commands 560 provided by the LIN interface 516 to the microprocessor 504 may contain information whether the low speed or high speed wiper motor speed has been selected by the vehicle operator. Further, the wiper commands 560 may indicate whether the vehicle operator has selected to clean the windshield window. The microprocessor 504 may affect the position of a wash pump switch 524, which in turn activates power to a wash pump for the up wash 598. The microprocessor 504 may further affect the position of the switch 520, which in turn may activate power to another wash pump for the down wash 596.

Figure 6:
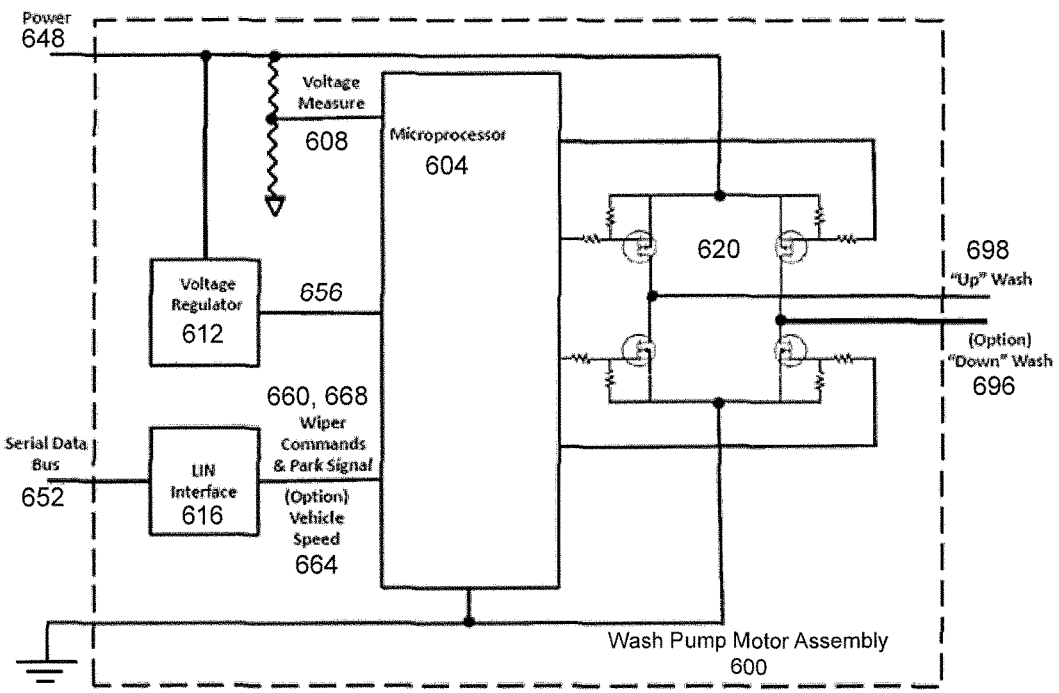
FIG. 6 shows an electronic circuit diagram of a windshield window wiping system in a wash pump motor assembly, with pulse with modulation of a wash pump, in accordance with one or more embodiments.

FIG. 6 illustrates an electronic circuit diagram of a windshield window wiping system in a wash pump motor assembly 600, with pulse with modulation of a wash pump, in accordance with one or more embodiments. Several components in FIG. 6 are similar to FIG. 5, e.g. the voltage measure circuitry 608 for the supply voltage, the voltage regulator 612, the regulated voltage 656, the LIN interface 616, the wiper commands 660, the park signal 668, and the vehicle speed 664 within the wash pump motor assembly 600. Further, FIG. 6 illustrates the supply voltage 648, the serial bus 652, the output to a wash pump for the up wash 698, and the output for a wash pump for the down wash 696. However, FIGS. 5 and 6 differ in that in FIG. 6, the microprocessor 604 controls the wash pump motor of the a wash pump or multiple wash pumps via a second electronic circuit 620. The second electronic circuit 620 in FIG. 6 may also be located within the wash pump motor assembly 600. Controlling the wash pump motor or multiple wash pump motors with pulse width modulation (PWM) advantageously allows to dynamically adjusting the pressure of the projected wash fluid toward the windshield window during a wiper stroke. In one or more embodiments, the PWM of the wash pump motor or multiple wash pump motors may be performed by a MOSFET driver. In other embodiments, the PWM of the wash pump motor or multiple wash pump motors may be performed by a different driver. However, the present disclosure is not limited to pulse width modulation of the wash pump motor or multiple wash pump motors. Other embodiments may utilize other techniques to dynamically control the pressure of the projected wash fluid. In one or more embodiments, the supply voltage to the wash pump motor or multiple wash pump motors may be dynamically controlled to affect the wash fluid pressure during projection toward the windshield window. In yet other embodiments, the wash pump motor may utilize a stepper motor and the microprocessor 604 may dynamically adjust the pressure of the wash fluid by controlling the number of stepper motor steps executed per unit time. Yet other embodiments may utilize other wash pump motor control techniques that differ from the wash pump motor controls discussed above.

In addition, with respect to dynamic pressure control of the projected wash fluid illustrated in FIG. 6, one or more embodiments may utilize only a first nozzle of a hood mount and the wash fluid may be projected from the first nozzle toward the windshield window with lower pressure during the up stroke and with higher pressure during the down stroke. Therefore, at lower pressure, the wash fluid may be projected at a lower location on the windshield window in front of the leading edge of the wiper blade during the up stroke. Similarly, at higher pressure, the wash fluid may be projected at a higher location on the windshield window in front of the leading edge of the wiper blade during the down stroke. Alternatively, other embodiments may utilize only a first nozzle of a hood mount in combination with a fluid restriction valve. Specifically, the fluid restriction valve may result in a pressure drop of the wash fluid and may be activated to project the wash fluid at a lower location on the windshield window in front of the leading edge of the wiper blade during the up stroke. For the down stroke, the fluid restriction valve may be deactivated and the wash fluid may be projected at a higher location on the windshield window in front of the leading edge of the wiper blade during the down stroke.

Figure 7:
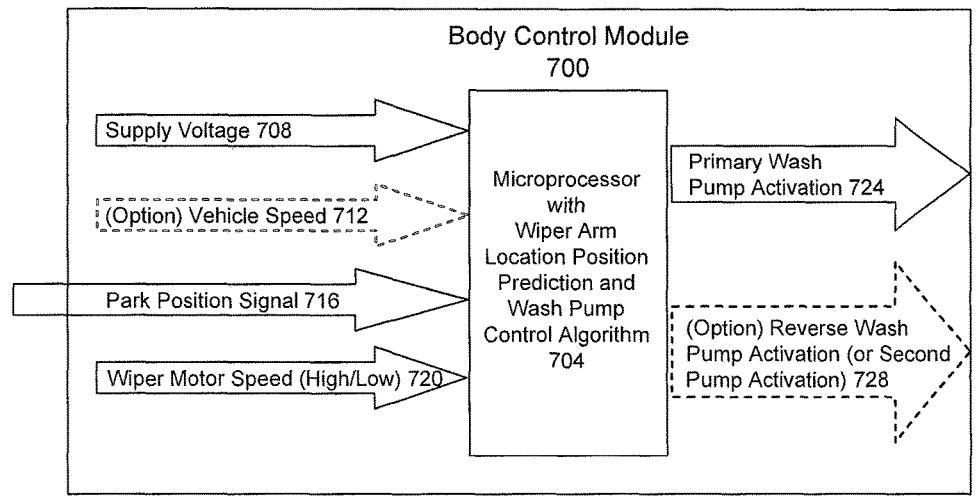
FIG. 7 shows inputs and outputs from a microprocessor of a windshield window wiping system in a body control module in accordance with one or more embodiments.

FIG. 7 shows inputs and outputs from a microprocessor of a windshield window wiping system in a body control module (BCM) 700 in accordance with one or more embodiments. A BCM is an electronic control unit for various components and functions in a vehicle. For the sake of brevity, only the differences to FIGS. 2 and 4 will be explained. However, all variations and alternate embodiments described with respect to FIGS. 2 and 4 are also applicable to FIG. 7 as well. In FIG. 7, the microprocessor 704 may be a part of a first electronic circuit. In the embodiment in FIG. 7, the microprocessor 704 is located in the BCM 700. Placing the first electronic circuit into the BCM 700 may be advantageous from a cost-perspective because the supply voltage 708 of the wiper motor, which is essentially the supply voltage of the wash pump, is readily available inside the BCM 700. In addition, other potential inputs to the microprocessor 704 may be the vehicle speed 712 and the wiper motor speed 720, which are already available inside the BCM 700. Another potential input to the microprocessor 704 may be the park position signal 716, which may have to be provided from externally to the BCM 700. In the embodiment in FIG. 7, an output of the microprocessor 704 may be a signal 724 to activate a primary wash pump. In other embodiments, a further output of the microprocessor 704 may be a signal 728 to activate a second wash pump.

Figure 8:
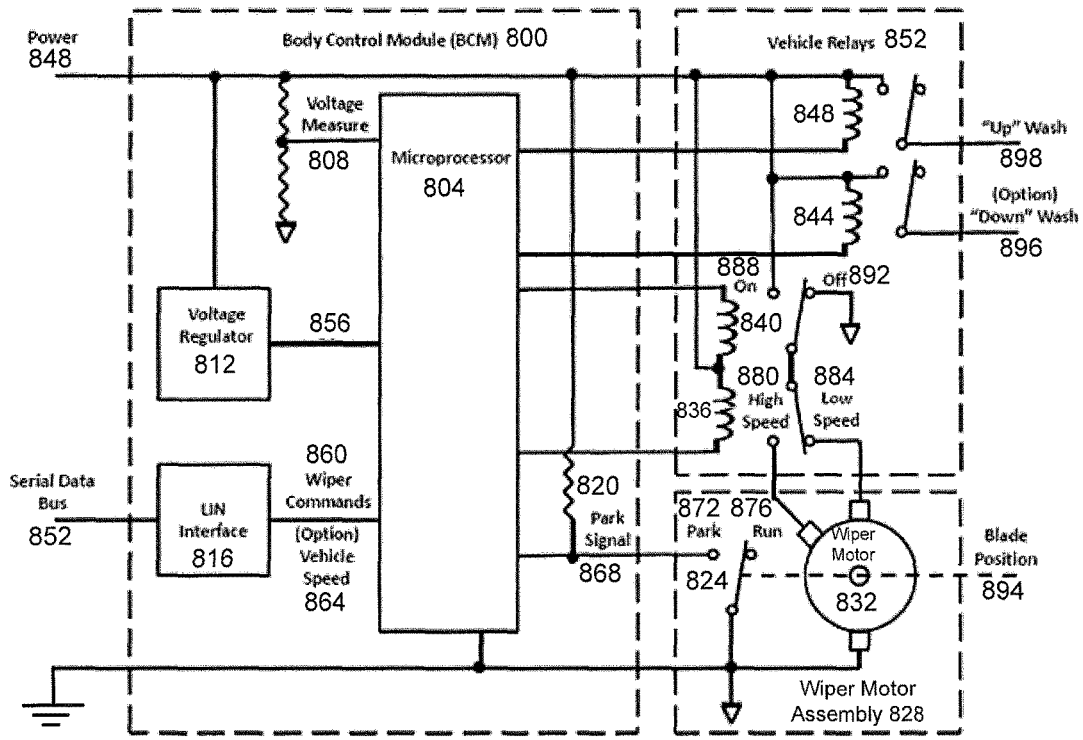
FIG. 8 shows an electronic circuit diagram of a windshield window wiping system in a body control module in accordance with one or more embodiments.

Referring now to FIG. 8, FIG. 8 illustrates an electronic circuit diagram of a windshield window wiping system in a body control module (BCM) in accordance with one or more embodiments. Specifically, FIG. 8 shows vehicle relays 852 as well as electronic components in the BCM 800 and in the wiper motor assembly 828. In accordance with one or more embodiments, a microprocessor 804 is located within the BCM 800. For the sake of brevity, only the differences to FIGS. 3, 5, and 6 will be explained. However, all variations and alternate embodiments described with respect to FIGS. 3, 5, and 6 are also applicable to FIG. 8 as well. In FIG. 8, the microprocessor 804 may be a part of a first electronic circuit. Several components in FIG. 8 are similar to FIGS. 3, 5, and 6, e.g. the voltage measure circuitry 808 for the supply voltage, the voltage regulator 812, the regulated voltage 856, the LIN interface 816, the wiper commands 860, and the vehicle speed 864 within the BCM 800. Also, the park position signal input 868 and the pull-up resistor 820 are provided in the BCM 800. Further, FIG. 8 illustrates the supply voltage 848 and the serial data bus 852. As previously discussed with respect to FIG. 7, when the microprocessor 704 is located within the BCM 700, then the park position signal may need to be provided from externally to the BCM 700. Accordingly, FIG. 8 illustrates the location of the wiper motor 832 and the wiper motor switch 824 in the wiper motor assembly 828, the wiper motor switch 824 providing the park position signal to the microprocessor 804 in the BCM 800. The wiper motor switch 824 may have a "park" position 872 and a "run" position 876 and the blade position 894 may affect the "park" or "run" position of the wiper motor switch 824. In one or more alternative embodiments, the park position signal may be provided to the microprocessor 804 via the LIN interface 816. In yet other embodiments, the park position signal may be wirelessly provided to the microprocessor 804.

FIG. 8 further shows vehicle relays 852 which are driven by outputs of the microprocessor 804. For example, relay 836 may select between low speed 884 and high speed 880 wiper motor operation. In addition, the microprocessor 804 may affect the On position 888 and Off position 892 of relay 840. Further, the microprocessor 804 may affect the position of a wash pump relay 848, which in turn activates power to a wash pump for the up wash 898. FIG. 8 also illustrates that the microprocessor may further affect the position of the relay 844, which in turn may activate power to another wash pump for the down wash 896. One of ordinary skill in the art knows and appreciates that driving relays from the output of a microprocessor 804 is one option of controlling vehicle components. Other embodiments may utilize power transistors instead of relays to control vehicle components. In yet other embodiments, the controlling of vehicle components may be achieved by pulse width modulation. However, the present disclosure is not limited to these particular embodiments and other embodiments may utilize different approaches of controlling vehicle components by the microprocessor 804.

Figure 9:
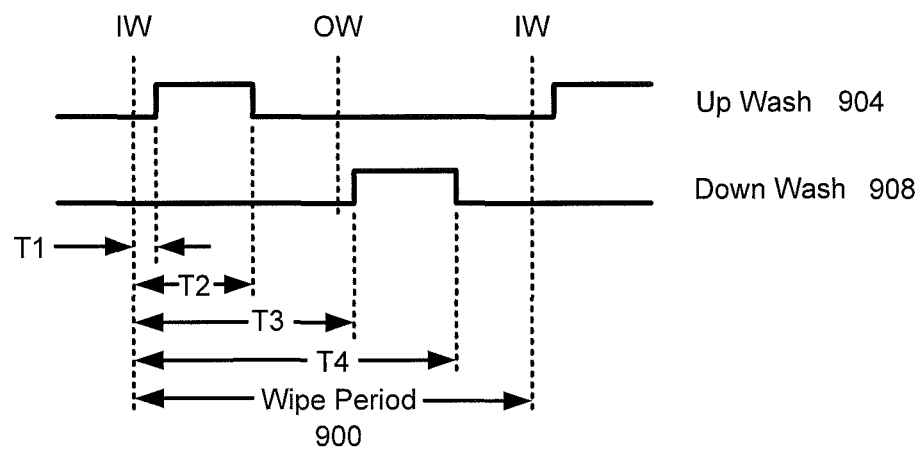
FIG. 9 shows a timing diagram for a method of wiping a windshield window, illustrating when a wash pump is turned on and off in relation to the wiper blade positions, in accordance with one or more embodiments.

FIG. 9 shows a timing diagram for a method of wiping a windshield window, illustrating when a wash pump is turned on and off in relation to the wiper blade positions, in accordance with one or more embodiments. Specifically, FIG. 9 refers to a timing diagram for an "up wash" 904 and a timing diagram for a "down wash" 908. In one or more embodiments, the "up wash" 904 refers to the projection of windshield wiper fluid toward the windshield window during the up stroke. Similarly, in one or more embodiments, the "down wash" 908 refers to the projection of windshield wiper fluid toward the windshield window during the down stroke. In FIG. 9, "IW" refers to the windshield wiper in-wipe position, while "OW" refers to the windshield wiper out-wipe position. As mentioned before, in one or more embodiments, the IW position of the wiper blade may also be referred to as park position of the wiper blade. Further, the OW position of the wiper blade may also be referred to as the maximum up stroke position. At the IW position of the wiper blade, the time is set to zero.

Still referring to FIG. 9, in one or more embodiments, T1 denotes a time which starts when the wiper blade is in the park position (but is just about to start the up stroke across the windshield window) and ends when a first wash pump has been turned on. In one or more embodiments, the turned on first wash pump projects wash fluid toward the windshield window, specifically in front of the just starting to move wiper blade. While the wiper blade moves across the windshield window toward the OW position, the first wash pump continues to project wash fluid toward the windshield window in front of the wiper blade until time T2 has been reached. At time T2, the first wash pump is switched off and the wiper blade continues the up stroke toward the OW position. At time T3, the wiper blade has already reached the OW position and has started to begin the down stroke toward the IW position (park position). In one or more embodiments, a second wash pump is turned on at time T3 and the second wash pump projects wash fluid toward the windshield window, specifically in front of the moving wiper blade. While the wiper blade moves across the windshield window toward the IW position, the second wash pump continues to project wash fluid toward the windshield window in front of the wiper blade until time T4 has been reached. At time T4, the second wash pump is switched off and the wiper blade continues the down stroke toward the IW position. The time interval between the time when the wiper blade is initially in the IW position to the time when the wiper blade returns to the IW position is also referred to as wipe period 900. Once the wipe period 900 has elapsed, the timing diagram starts from the beginning until a predetermined number of wipe periods 900 has been achieved.

Figure 10:
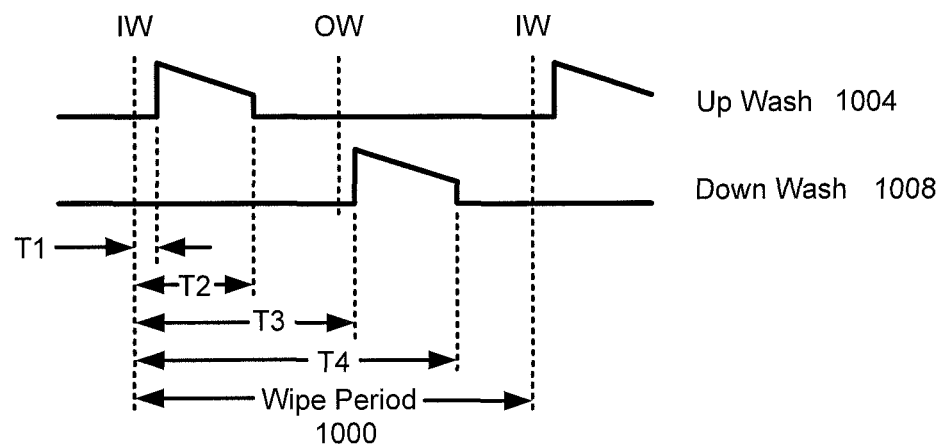
FIG. 10 shows a timing diagram for a method of wiping a windshield window, illustrating pressure control of a wash pump using pulse width modulation, in accordance with one or more embodiments.

In one or more embodiments the predetermined number of wipe periods is two. In other embodiments, the predetermined number is a single wipe period. In yet other embodiments, the predetermined number is more than two wipe periods. However, as described above, the present disclosure is not limited by these embodiments. Alternate embodiments may utilize only a single wash pump, a primary and a secondary wash pump, or a single wash pump with an added valve or valves. Further, other embodiments may utilize multiple projections of windshield window wiper fluid toward the windshield window during both, the up stroke and the down stroke. Alternatively, in yet other embodiments there may be multiple projections of windshield wiper fluid toward the windshield window only during the up stroke or only during the down stroke. Yet other embodiments may optimize the windshield wiper fluid toward the windshield window using different fluid pressures during a single projection or using different fluid pressure during multiple projections as shown in FIG. 10. The different fluid pressures during a single projection are also referred to as fluid pressure profile.

FIG. 10 shows a timing diagram for a method of wiping a windshield window, illustrating pressure control of a wash pump using pulse width modulation, in accordance with one or more embodiments. Specifically, FIG. 10 refers to a timing diagram for an "up wash" 1004 and a timing diagram for a "down wash" 1008. The time interval between the time when the wiper blade is initially in the IW position to the time when the wiper blade returns to the IW position is also referred to as wipe period 1000. For the sake of brevity, only the differences to FIG. 9 will be explained. However, all variations and alternate embodiments described with respect to FIG. 9 are also applicable to FIG. 10 as well. As described above, controlling the wash pump motor or multiple wash pump motors with pulse width modulation (PWM) advantageously allows to dynamically adjusting the pressure of the projected wash fluid toward the windshield window during a wiper stroke. The varied pressure of the projected wash fluid, i.e. the fluid pressure profile, is indicated in FIG. 10 as a pressure decrease (vertical difference for wash pump "on" in timing diagram) at time T1 and ending at T2 during the up wash and starting at time T3 and ending at time T4 during the down wash. However, the present disclosure is not limited to pulse width modulation of the wash pump motor or multiple wash pump motors. Other embodiments may utilize other techniques to dynamically control the pressure of the projected wash fluid as described in reference to FIG. 6. Further, in one or more embodiments, the fluid pressure profile may be different depending on the vehicle speed.

In accordance with one or more embodiments of the method of wiping a windshield window, FIGS. 11*a*, 11*b*, 11*c*, and 11*d* show the assigned values of the wash pump timings T1 (up stroke, wash pump on/"Up Wash ON"), T2 (up stroke, wash pump off/"Up Wash OFF"), T3 (down stroke, wash pump on/"Down Wash ON"), and T4 (down stroke, wash pump off/"Down Wash OFF") in FIGS. 9 and 10 in dependency of the wiper motor supply voltage, vehicle speed, and wiper motor speed, in accordance with one or more embodiments. Specifically, FIGS. 11*a*, 11*b*, 11*c*, and 11*d* show the wiper motor supply voltage vertically, and the vehicle speed horizontally. A division between low and high wiper motor speed is also provided on the horizontal axis. The wash pump timings in FIGS. 11*a*, 11*b*, 11*c*, and 11*d* are in milliseconds (ms).

As can be seen from FIG. 11*a*, the assigned time T1 decreases with increasing vehicle speed. The same is valid for the assigned times T2, T3, and T4 in FIGS. 11*b*, 11*c*, and 11*d*. The reason for the decreased assigned time for increased vehicle speeds is, because the wiper motor speed increases for increased vehicle speeds due to increased wind drag on the wiper blades. Consequently, a smaller time is needed at a high vehicle speed for the wiper blade to reach the same position when compared to a larger time at low vehicle speed. As can further be seen from FIG. 11*a*, the assigned time T1 is smaller for the high wiper speed when compared to the low wiper speed. Assigned times T2, T3, and T4 in FIGS. 11*b*, 11*c*, and 11*d* behave similarly. This is, because at high wiper speed, the wash pump or several wash pumps have to be turned on (and off) faster when compared to the low wiper speed to reach the same wiper blade position.

In addition, it can be seen from FIGS. 11*a*, 11*b*, 11*c*, and 11*d*, that the assigned times T1 through T4 are smaller with increasing wiper motor supply voltage. This is the results of that at higher wiper motor supply voltages, the wiper motor speed increases and consequently a smaller time is needed at high wiper motor supply voltage for the wiper blade to reach the same position when compared to a smaller wiper motor supply voltage. However, the present disclosure is not limited to the assigned times T1, T2, T3, and T4 in respective FIGS. 11*a*, 11*b*, 11*c*, and 11*d*. In one or more embodiments, the assigned times may be larger or smaller than the assigned times T1, T2, T3, and T4 in respective FIGS. 11*a*, 11*b*, 11*c*, and 11*d*. In other embodiments, the assigned times may not decrease monotonously with increasing wiper motor supply voltage, increasing vehicle speed and at the low or high wiper motor speed setting. Other embodiments may utilize a smaller set of assigned timings, for example, in the case when only a single wash pump is used. Additional embodiments may contain a larger set of assigned timings, for example, in the case when multiple projections of windshield wiper fluid toward the windshield window during the up stroke or during the down stroke are used. In yet other embodiments, the assigned timings may be adjusted for the utilization of varied wash fluid pressure during a single projection or during multiple wash fluid projections toward the windshield window.

In yet additional embodiments, the assigned timings for a specific vehicle or vehicle configuration may be determined empirically, semi-empirically, from theoretical calculations or from simulations. Further, the assigned timings may be measured or estimated under actual driving conditions. For example, the position of the wiper blade across the windshield window may be measured at fixed time intervals starting at time=0 for when the wiper blade is in the IW position and the internal wiper blade switch is closed. The position of the wiper blade across the windshield window may be measured for various vehicle speeds, wiper motor supply voltages, and for the high/low wiper motor speed conditions. From the measured positions of the wiper blade across the windshield window at fixed time intervals, the timings can be calculated for when the wash pump or wash pumps must be turned on and off. Specifically, in one or more embodiments, the "on" and "off" timing for the wash pump may be selected such that the wash fluid is projected in front of the leading edge of the wiper blade.

Alternatively, the assigned timings may be measured or estimated in a wind tunnel. For example the vehicle velocity may be simulated in a wind tunnel by adjusting the flow of air in the wind tunnel to be equal to the intended vehicle speed. In addition, a high-speed camera may be directed at the windshield window and may record the position of the windshield wiper across the windshield window at known fixed time intervals starting at time=0 for when the wiper blade is in the IW position and the internal wiper blade switch is closed. Further, during the wind tunnel measurements, the wiper motor supply voltage may be "simulated" by manually adjusting the wiper motor supply voltage from an external power source. As described above, from the evaluated camera images of the positions of the wiper blade across the windshield window at known time intervals, the timings to turn the wash pump on and off can be selected such that the wash fluid is projected in front of the leading edge of the wiper blade. However, the present disclosure is not limited to these embodiments and the timings to turn on and off the wash pump or wash pumps may be selected such as that the wash fluid is projected in front, behind, or both in front and behind the leading edge of the wiper blade.

In one or more embodiments, a suitable mathematical expression may be fitted to the calculated or estimated wash pump timing values as a function of input parameters, such as the wiper motor supply voltage, vehicle speed, high/low wiper motor speed, etc. In other embodiments, the determined position of the wiper blade across the windshield window as a function of time may be fitted with a suitable mathematical function. Regardless of whether a mathematical expression is fitted to the timing values or to the position of the wiper blade as a function of the above referenced input parameters, the wash pump or wash pumps need to be turned on or off at the appropriate time or wiper position and one can be converted into the other and vice versa.

In other embodiments, a fractional factorial or full factorial design-of-experiments (DOE) may be executed to determine whether any interactions exist between the input parameters. A full factorial DOE refers to that the wiper blade position on the windshield window for known fixed time intervals starting at time=0 (IW position) is determined for all combinations of input parameters. In contrast, a fractional factorial DOE may be performed when it is certain that some combinations of input parameters do not significantly affect the wiper blade position. The determination of when the wash pump or wash pumps need to be turned on or off may only need to be determined once for a particular vehicle or vehicle configuration. In one or more embodiments, a correction factor may be used to compensate for any aging of the windshield wiper motor, alternator, or other components of the vehicle. In other embodiments, a value may enter the timing calculations reflecting whether the wiper blade has just been replaced. That is, because in one or more embodiments, the position of the wiper blade on the windshield window may be affected by friction between the leading edge of the wiper blade and the windshield window. As wear occurs on the wiper blade over time, the friction between the leading edge of the wiper blade and the windshield window may change over time and in turn may affect the position of the wiper blade on the windshield window.

Figure 12A:
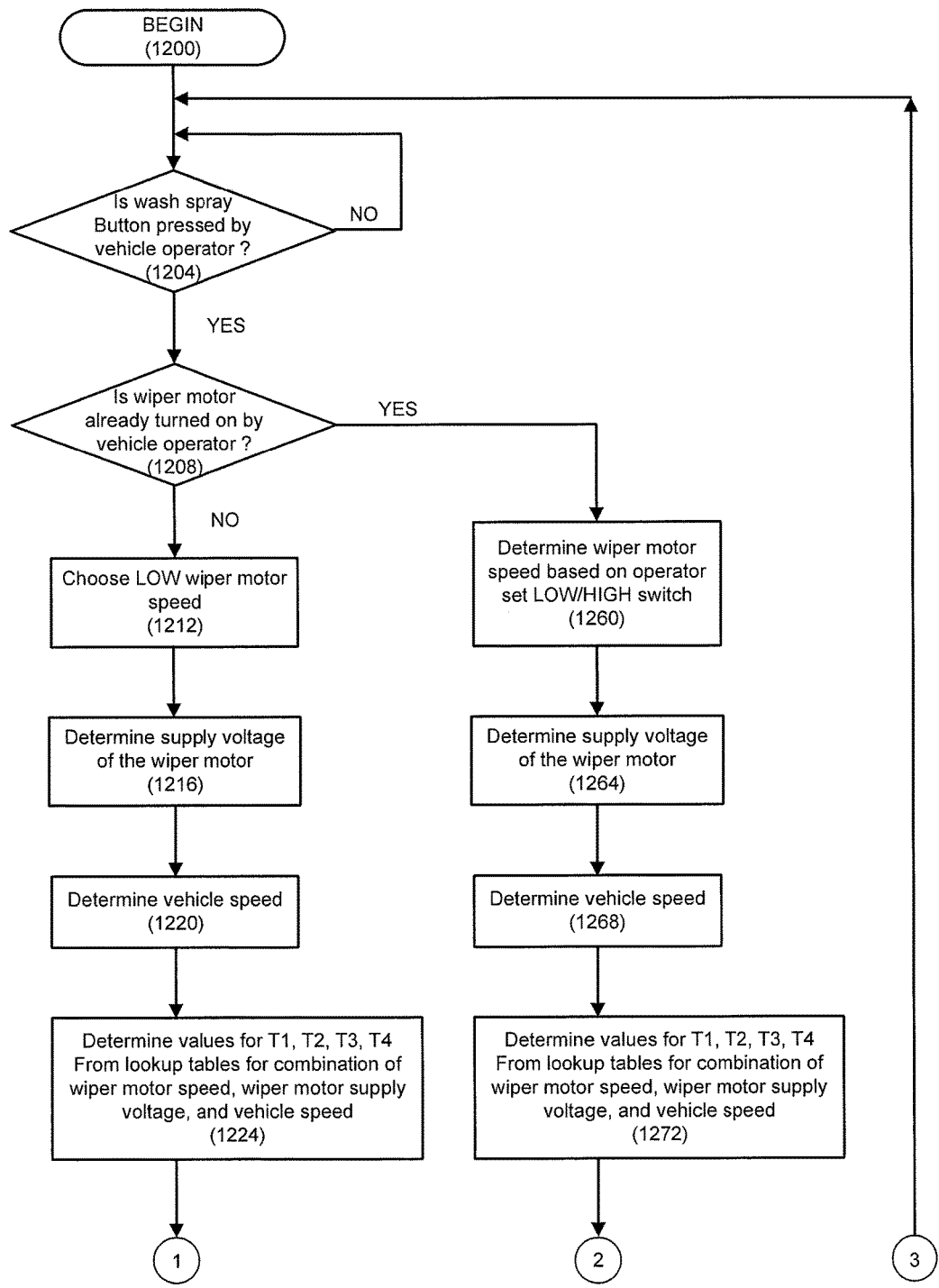
FIGS. 12a and 12b illustrate a flowchart for a method of wiping a windshield window in accordance with one or more embodiments.
Figure 12B:
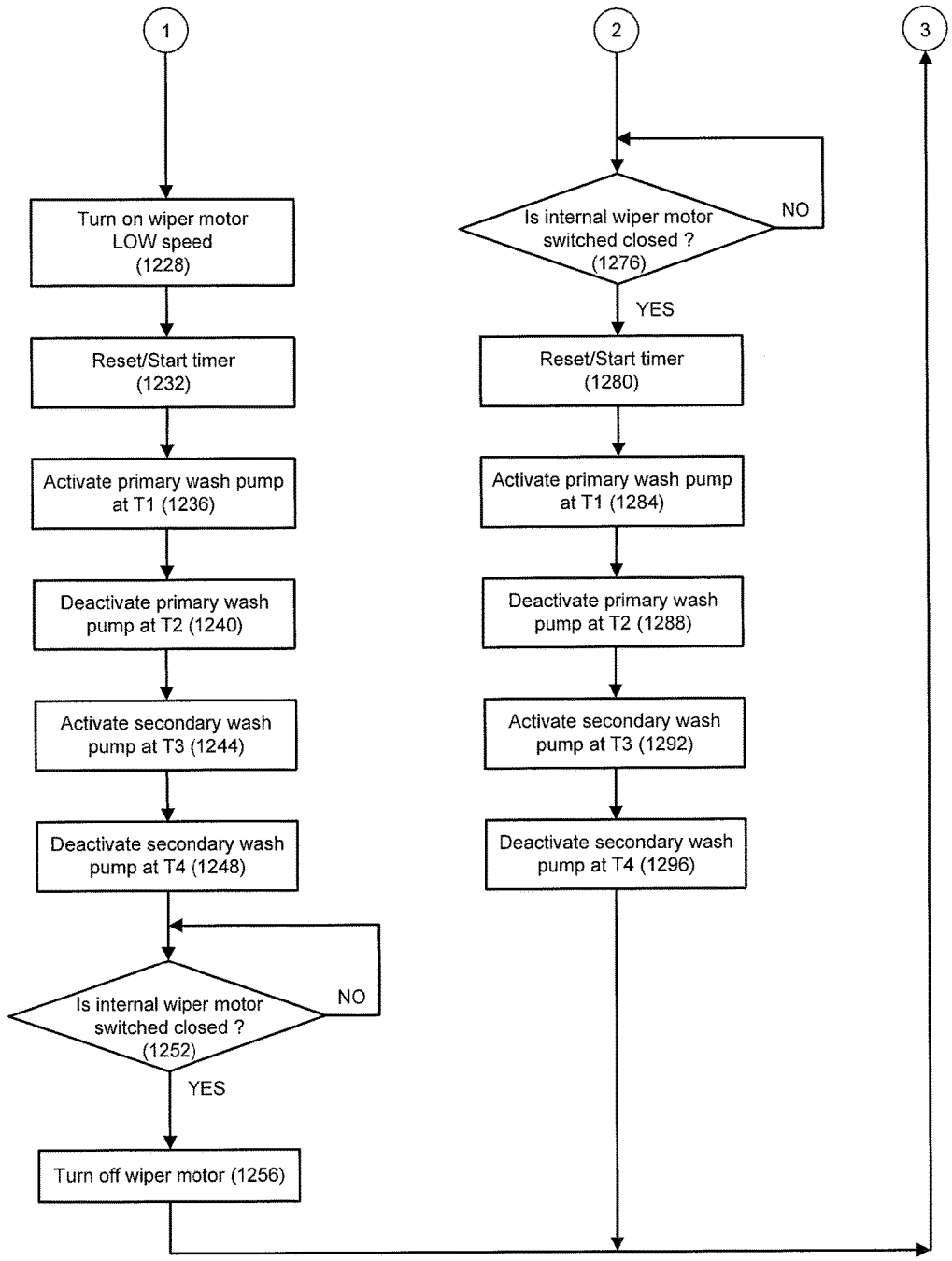

FIGS. 12*a* and 12*b* illustrate a flowchart for a method of wiping a windshield window in accordance with one or more embodiments. In one or more embodiments, the method of wiping a windshield window includes connecting a wiper motor operatively to a wiper blade and bringing the wiper blade in contact with a windshield window. Further, the method of wiping a windshield window may also include estimating a position of the wiper blade during a wiper blade stroke across the windshield window. In addition, the method may include projecting a wash fluid toward the windshield window through a first nozzle of a hood mount and synchronizing the projection of wash fluid toward the windshield window with the estimated position of the wiper blade. In other embodiments, the method of wiping a windshield window may further include projecting a wash fluid toward the windshield window through a second nozzle of a hood mount, wherein the first nozzle of the hood mount and the second nozzle of the hood mount sequentially project the wash fluid toward the windshield window during an up stroke and a down stroke of the wiper blade.

Further, with respect to dynamic pressure control of the projected wash fluid, one or more embodiments may utilize only a first nozzle of a hood mount and the wash fluid may be projected from the first nozzle toward the windshield window with lower pressure during the up stroke and with higher pressure during the down stroke. Therefore, at lower pressure, the wash fluid may be projected at a lower location on the windshield window in front of the leading edge of the wiper blade during the up stroke. Similarly, at higher pressure, the wash fluid may be projected at a higher location on the windshield window in front of the leading edge of the wiper blade during the down stroke. Alternatively, other embodiments may utilize only a first nozzle of a hood mount in combination with a fluid restriction valve. Specifically, the fluid restriction valve may result in a pressure drop of the wash fluid and may be activated to project the wash fluid at a lower location on the windshield window in front of the leading edge of the wiper blade during the up stroke. For the down stroke, the fluid restriction valve may be deactivated and the wash fluid may be projected at a higher location on the windshield window in front of the leading edge of the wiper blade during the down stroke.

Specifically, the method of wiping a windshield window in accordance with one or more embodiments starts at 1200. At 1204 it is verified whether a wash spray button has been pressed by a vehicle operator. If the wash spray button has not been pressed by the vehicle operator, the method keeps checking whether the wash spray button has been pressed. In the event that the wash spray button has been pressed by the vehicle operator at 1204, the method continues to 1208 at which it is next verified whether the wiper motor is already turned on by the vehicle operator. This verification at 1208 distinguishes between a first case in which the wiper motor is not yet running, e.g. because it is sunny but the operator has pressed the wash spray button to clean the windshield window and a second case in which the wiper motor is already running, e.g. because of rain and the operator has pressed the wash spray button to clean the windshield.

In the first case the method continues to 1212 at which a low wiper motor speed is selected. The method then proceeds to 1216 at which the supply voltage to the wiper motor is determined. Next, the method continues at 1220 at which the vehicle speed is determined. Once, the wiper motor speed is selected and the supply voltage to the wiper motor and the vehicle speed are known, the method continues at 1224 at which timing values for T1, T2, T3, T4 are obtained from one or more lookup tables for the particular combination of wiper motor speed wiper motor supply voltage, and vehicle speed. The method then proceeds to 1228 at which the wiper motor is turned on at low speed in accordance with the selected low wiper motor speed at 1212. The method continues at 1232 at which a timer is reset and started. Specifically, the timer measures the time with respect to FIGS. 9 and 10 starting from the in-wipe (IW) position of the wiper blade when an internal wiper motor switch is closed. Once the timer has been started at 1232 and the wiper blade starts the up stroke, the method continues to 1236 at which a primary wash pump is activated (turned on) when the timer reaches the time T1. As a result of the wash pump activation at time T1, wash spray is projected toward the windshield window in front of the leading edge of the wiper blade.

The method then proceeds to 1240 at which the primary wash pump is deactivated (turned off) when the timer reaches the time T2. Once the primary wash pump is turned off, the projection of wash spray toward the windshield window is stopped and the wiper blade continues the up stroke. Once the wiper blade reaches the out-wipe (OW) position, the wiper blade starts the down stroke. The method continues at 1244 at which the down stroke has just started and the secondary wash pump is activated when the timer reaches the time T3. As a result of the wash pump activation at time T3, wash spray is projected toward the windshield window in front of the leading edge of the wiper blade. The method then proceeds to 1248 at which the secondary wash pump is deactivated (turned off) when the timer reaches the time T4. Once the secondary wash pump is turned off, the projection of wash spray toward the windshield window is stopped and the wiper blade continues the down stroke The method then continues at 1252 at which it is verified whether the internal wiper motor switch is closed, i.e. when the wiper blade has continued the down ramp and has reached the IW position again. If the internal wiper motor switched is not closed at 1252, the method continues verifying whether the internal wiper motor switch is closed. In case the internal wiper motor switch is closed at 1252, the method proceeds to 1256 at which the wiper motor is turned off when the when the wiper blade has reached the IW position again. Once the wiper motor is turned off at 1256, the method continues at 1204 at which it is once again verified whether a wash spray button has been pressed by a vehicle operator.

As previously mentioned, the verification at 1208 distinguishes between a first case in which the wiper motor is not yet running, e.g. because it is sunny but the operator has pressed the wash spray button to clean the windshield window and a second case in which the wiper motor is already running, e.g. because of rain and the operator has pressed the wash spray button to clean the windshield.

In the second case the method continues to 1260 at which it is determined based on the wiper motor low/high switch, whether the vehicle operator has set the wiper motor speed to the low speed setting or to the high speed setting. The method then proceeds to 1264 at which the supply voltage to the wiper motor is determined. Next, the method continues at 1268 at which the vehicle speed is determined. Once, the wiper motor speed set by the operator is determined and the supply voltage to the wiper motor and the vehicle speed are known, the method continues at 1272 at which timing values for T1, T2, T3, T4 are obtained from one or more lookup tables for the particular combination of wiper motor speed wiper motor supply voltage, and vehicle speed. The method then proceeds to 1276 at which it is verified whether the internal wiper motor switch is closed. Since the wiper motor is already running as determined at 1208, the method verifies at 1276 when the wiper blade is in the IW position, i.e. when the internal wiper motor switch is closed. If the internal wiper motor switch is not closed at 1276, the method continues checking whether the internal wiper motor switch is closed.

If the internal wiper motor switch is closed, the method proceeds to 1280 at which a timer is reset and started. As described above, the timer measures the time with respect to FIGS. 9 and 10 starting from the in-wipe (IW) position of the wiper blade when an internal wiper motor switch is closed. Once the timer has been started at 1280 and the wiper blade starts the up stroke, the method continues to 1284 at which a primary wash pump is activated (turned on) when the timer reaches the time T1. As a result of the wash pump activation at time T1, wash spray is projected toward the windshield window in front of the leading edge of the wiper blade.

The method then proceeds to 1288 at which the primary wash pump is deactivated (turned off) when the timer reaches the time T2. Once the primary wash pump is turned off, the projection of wash spray toward the windshield window is stopped and the wiper blade continues the up stroke. Once the wiper blade reaches the out-wipe (OW) position, the wiper blade starts the down stroke. The method continues at 1292 at which the down stroke has just started and the secondary wash pump is activated when the timer reaches the time T3. As a result of the wash pump activation at time T3, wash spray is projected toward the windshield window in front of the leading edge of the wiper blade. The method then proceeds to 1296 at which the secondary wash pump is deactivated (turned off) when the timer reaches the time T4. Once the secondary wash pump is turned off, the projection of wash spray toward the windshield window is stopped and the wiper blade continues the down stroke. Once the secondary wash pump is turned off at 1296, the method continues at 1204 at which it is once again verified whether a wash spray button has been pressed by a vehicle operator.

Still referring to FIGS. 12*a* and 12*b*, it was described above that the method verifies at 1208 whether the wiper motor is already turned on by the vehicle operator. Subsequently, this verification at 1208 distinguishes between a first case in which the wiper motor is not yet running, e.g. because it is sunny but the operator has pressed the wash spray button to clean the windshield window and a second case in which the wiper motor is already running, e.g. because of rain and the operator has pressed the wash spray button to clean the windshield. In the first case, the method proceeds with 1212 through 1256 while in the second case, the method continues with a parallel path 1260 through 1296 before rejoining again at 1204. The difference between these two parallel paths is that in the first case, the wiper motor is not running yet and needs to be turned on and turned off. In contrast in the second case, the wiper motor is already running and the method needs to determine at which speed the wiper motor is running and when the wiper blade is in the IW position. Once the second case completes the path 1260 through 1296, the wiper motor remains running (i.e. because of inclement weather) until the vehicle operator eventually switches the wiper motor off.

However, the present disclosure is not limited to the embodiment described with respect to the method flowchart in FIGS. 12*a* and 12*b*. One of ordinary skill in the art knows and appreciates that the method of wiping a windshield window could be realized differently. For example, in one or more embodiments, the method does not have to remain at 1204 until the wash spray button is pressed by the vehicle operator. Specifically, the method may check periodically at 1204 whether the wash spray button has been pressed by the vehicle operator. Meanwhile, while the method is not actively checking at 1204, the method may continue doing other activities. Of course, the time between periodic checking at 1204 may be chosen small enough as to allow a responsive wash pump control. Once the wash spray button has been pressed by the vehicle operator, the method may set a flag at 1204 indicating that such event has occurred. Such flag may be reset once the method completes the windshield wiping. Similarly, in other embodiments, the method does not have to remain at 1252 and 1276, respectively and similar periodic checking as described with respect to 1204 may be applied. In yet other embodiments, the method may utilize a microprocessor interrupt control, i.e. a switch which is operatively connected to an interrupt input of the microprocessor and which signals an interrupt signal to the microprocessor when the respective switch is closed. Subsequently, a program execution for the method may be transferred to a different portion of the program in response to the respective switch being closed.

Yet further, with respect to the embodiment of wiping a windshield window in FIGS. 12a and 12b, one of ordinary skill in the art knows and appreciates that the method does not have to be performed in two parallel execution paths 1212 through 1256 for the first case and 1260 through 1296 for the second case before rejoining again at 1204. In one or more embodiments, the method may utilize a single path for the first and second cases and may further utilize flags or variables in the single path to trigger actions that differ for the first and second cases. In addition, the embodiment of wiping a windshield window in FIGS. 12a and 12b has been described with respect to a single wipe period, i.e. one up wash and one down wash. One of ordinary skill in the art knows and appreciates that the method of wiping a windshield window may utilize other predetermined different wipe periods. For example, in one or more embodiments the predetermined number of wipe periods is two. In yet other embodiments, the predetermined number is more than two wipe periods.

Further, the embodiment of wiping a windshield window in FIGS. 12a and 12b has been described with respect to an up wash and a down wash during a wiper period. However, as described above, the present disclosure is not limited by these embodiments. Alternate embodiments may utilize only an up wash or only a down wash. Further, other embodiments may utilize multiple projections of windshield window wiper fluid toward the windshield window during both, the up wash and the down wash with corresponding more frequent activation and deactivation of the respective wash pump. Yet other embodiments may activate a wash pump or wash pumps with a predetermined fluid pressure profile to affect the pressure of the wash fluid toward the windshield window. The predetermined fluid pressure profile may differ for the up wash and the down wash. Alternatively, the predetermined fluid pressure profile may differ during multiple wash fluid projections during the up wash or during the down wash. Further, in one or more embodiments, the fluid pressure profile may be different depending on the vehicle speed.

In one more embodiments of the method of wiping a windshield window described with respect to FIGS. 12a and 12b, the lookup table in 1224 and/or 1272 may be substituted. For example, in alternative embodiments, a suitable mathematical expression may be fitted to the calculated or estimated wash pump timing values as a function of input parameters, such as the wiper motor supply voltage, vehicle speed, high/low wiper motor speed, etc. In other embodiments, the lookup table may be substituted with the determined position of the wiper blade across the windshield window as a function of time and may be fitted with a suitable mathematical function. Regardless of whether a mathematical expression is fitted to the timing values or to the position of the wiper blade as a function of the above referenced input parameters, the wash pump or wash pumps need to be turned on or off at the appropriate time or wiper position and one can be converted into the other and vice versa.

As described above, when the wiper blade is in the IW position, the internal wiper blade switch is closed in accordance with one or more embodiments. In addition, with respect to FIGS. 12a and 12b, a time is reset and started when the wiper blade is in the IW position and the wiper blade switch is closed. Accordingly, the estimation of the position of the wiper blade during the wiper blade stroke is based on the wiper blade switch, i.e. a reference signal for the position of the wiper blade from the wiper motor switch. In one or more embodiments, a single reference signal may be utilized for the up stroke and for the down stroke of the wiper blade. One of ordinary skill in the art knows and appreciates that the reference signal may be provided differently. For example, in other embodiments, the estimation of the position of the wiper blade during the wiper blade stroke may be based on measuring a pole switching of the wiper motor. The poles of a motor may be in a fixed relationship with a known angular rotation of the motor and measuring and counting the number of poles switches may be utilized to track the rotations of the motor and thus the position of the wiper blade on the windshield window.

As described with respect to 1212 through 1220 and 1260 through 1268 in FIG. 12a, one or more embodiments may estimate the position of the wiper blade during the wiper blade stroke based on the speed of the wiper motor, the supply voltage of the wiper motor, and/or on the vehicle speed. However, the present disclosure is not limited to these embodiments and other embodiments may utilize less or more inputs to estimate the position of the wiper blade on the windshield window during the windshield wiping. For example, the vehicle speed input may be replaced by a measurement of the wiper motor current. That is, at an increased vehicle speed, the mechanical loading on the wiper arm and wiper blade also increases and therefore the mechanical loading on the wiper motor increases as well. Thus, the wiper motor current measurement may replace the vehicle speed as inputs to estimate the position of the wiper blade on the windshield window during the windshield wiping.

In addition, in one or more embodiments, the estimation of the position of the wiper blade during the wiper blade stroke and the synchronization of the projection of the wash fluid toward the windshield window with the estimated position of the wiper blade, is performed in a wiper motor assembly, in a wash pump motor assembly, or in a body control module (BCM). However, the present disclosure is not limited to these embodiments and other embodiments may utilize other locations to estimate the position of the wiper blade on the windshield window during the windshield wiping. For example, the placement for the estimation for the position of the wiper blade may be guided by cost-effectiveness of the selected location, i.e. reduced routing of signals, smaller cable-tree, easier vehicle integration, proximity to specific components, signals, etc. Further, one or more embodiments may adjust the pressure of the wash fluid dynamically during the projecting of the wash fluid toward the windshield window, i.e. fluid pressure profile.

In one or more embodiments, the windshield window wiping system includes hardware (e.g., circuitry), software, firmware, or any combination thereof, that includes functionality to perform at least some functions described herein in accordance with one or more embodiments of the present disclosure. In one or more embodiments, the windshield window wiping system of the present disclosure is, at least in part, a software application, or a portion thereof, written in any programming language that includes instructions stored on a non-transitory computer readable medium which, when executed by one or more processors in a computing device, enable the computing device to perform the functions described in accordance with one or more embodiments of the disclosure. For example, in one or more embodiments, the non-transitory computer readable medium may include instructions, which, when executed by a processor, cause the processor to perform a wiper blade stroke across the windshield window, to estimate a position of the wiper blade during the wiper blade stroke, to project a wash fluid toward the windshield window through a nozzle of the hood mount, and to synchronize the projection of the wash fluid toward the windshield window with the estimated position of the wiper blade.

In other embodiments, the non-transitory computer readable medium may synchronize the projection of wash fluid with the estimated position of the wiper blade based on a lookup table containing a plurality of predetermined timing values, the plurality of predetermined timing values is associated with a timing of turning a wash pump on and off, and varies at least in response to one selected from the group consisting of a reference signal for a position of the wiper blade, a speed of the wiper motor, and a supply voltage to the wiper motor. In yet other embodiments, the synchronization of the projection of wash fluid with the estimated position of the wiper blade may be based on a mathematical expression. In further embodiments, the synchronization of the projection of wash fluid with the estimated position of the wiper blade may be used on yet other techniques.

Figure 13:
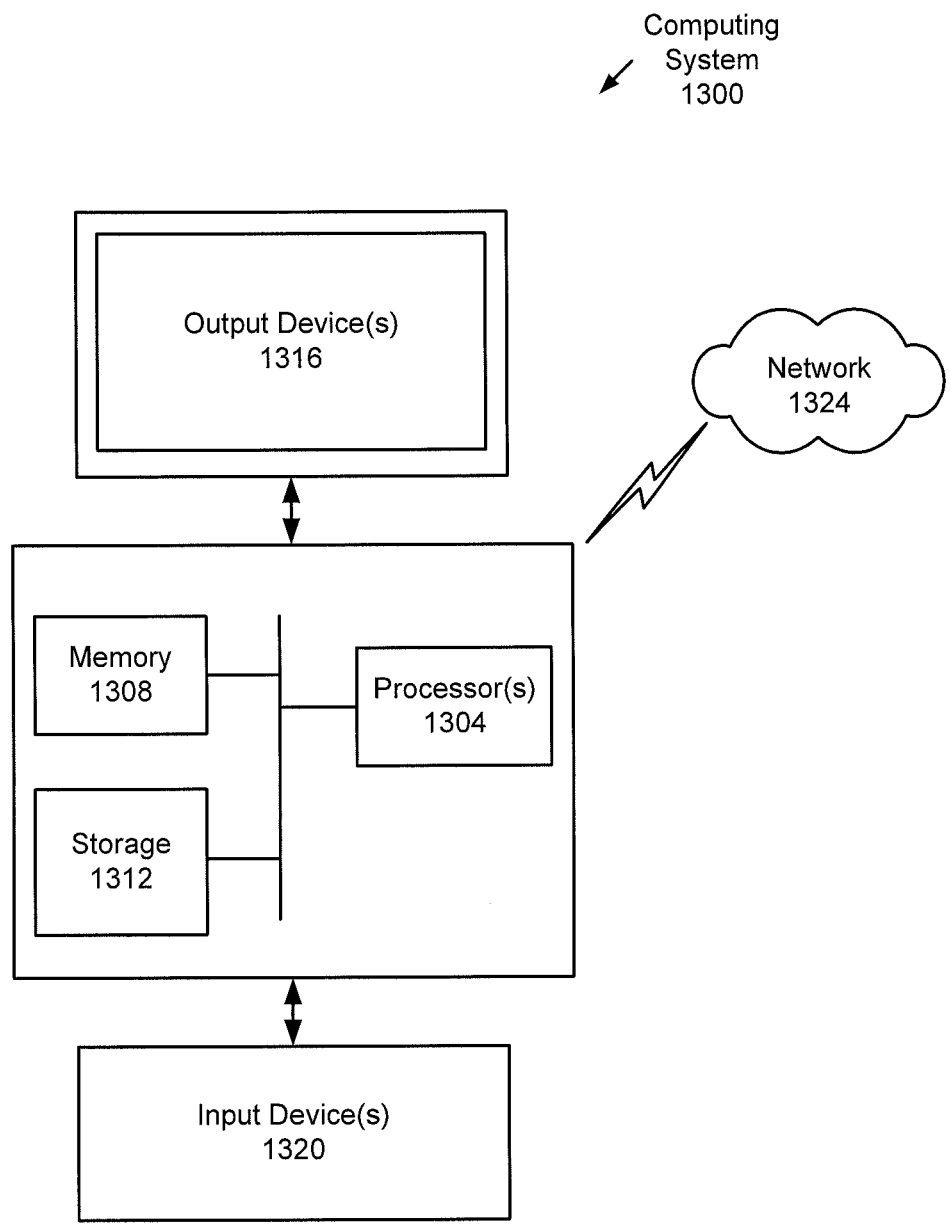
FIG. 13 shows a schematic of a computing system and a non-transitory computer readable medium in accordance with one or more embodiments.

Embodiments of the present disclosure may be implemented on virtually any type of computing system, regardless of the platform being used. In one or more embodiments, the computing system may be an embedded microcontroller with one or more microprocessors. For example, as shown in FIG. 13, the computing system (1300) may include one or more processor(s) (1304), associated memory (1308) (e.g., random access memory (RAM), cache memory, flash memory, etc.), one or more storage device(s) (1312) (e.g., a hard disk, an optical drive such as a compact disk (CD) drive or digital versatile disk (DVD) drive, a flash memory stick, a solid state drive (SSD), etc.), and numerous other elements and functionalities. The processor(s) (1304) may be an integrated circuit for processing instructions. For example, the processor(s) may be one or more cores, or micro-cores of a processor. The computing system (1300) may also include one or more input device(s) (1320), such as a touchscreen, keyboard, mouse, microphone, touchpad, electronic pen, or any other type of input device.

Further, the computing system (1300) may include one or more output device(s) (1316), such as a screen (e.g., a liquid crystal display (LCD), a plasma display, touchscreen, projector, or other display device), a printer, external storage, or any other output device. One or more of the output device(s) may be the same or different from the input device(s). The computing system (600) may be connected to a network (1324) (e.g., a local area network (LAN), a wide area network (WAN) such as the Internet, mobile network, or any other type of network) via a network interface connection (not shown). The input and output device(s) may be locally or remotely (e.g., via the network (1324)) connected to the processor(s) (1304), memory (1308), and storage device(s) (1312). Many different types of embedded and non-embedded computing systems exist, and the aforementioned input and output device(s) may take other forms. In one or more embodiments, the computing system may be a headless system, e.g. no input devices 1320 and/or no output devices 1320 are utilized.

In one or more embodiments, the inputs to the computing system include inputs received from a LIN or a CAN bus. In other embodiments, inputs to the computing system may be received as interrupt signals or as logic high/low signal from a switch wired to a microprocessor input. In yet other embodiments, the outputs from the computing system may be directed toward the LIN or CAN bus. In other embodiments, the outputs from the computing system may be directed to an output pin of the microprocessor which in turn is connected to a signal driver.

Software instructions in the form of computer readable program code to perform embodiments may be stored, in whole or in part, temporarily or permanently, on the non-transitory computer readable medium. Such non-transitory computer readable medium maybe an erasable programmable read only memory (EPROM), a flash memory, an internal or external storage device, a DVD, a CD, or any other computer or embedded microcontroller readable storage medium. Specifically, the software instructions may correspond to computer readable program code or embedded microcontroller readable program code that when executed by a processor(s), is configured to perform embodiments of the disclosure. In addition, the software instructions and the associated non-transitory computer readable medium may also be referred to as firmware. In one or more embodiments, the firmware of the windshield window wiping system can be updated.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A windshield window wiping system, comprising:
   a wiper blade in contact with a windshield window;
   a wiper motor operatively connected to the wiper blade, configured to perform a wiper blade stroke;
   a reservoir for a wash fluid;
   a first hood mounted nozzle, configured to project the wash fluid toward the windshield window;
   a wash pump, wherein the wash pump is hydraulically connected to the first hood mounted nozzle; and
   a first electronic circuit, configured to estimate a position of the wiper blade during the wiper blade stroke based on an input to the first electronic circuit and to synchronize the projection of the wash fluid toward the windshield window with the estimated position of the wiper blade,
   wherein the estimation of the position is based on a voltage of the wiper motor, or a reference signal of the wiper blade.

2. The windshield window wiping system according to claim 1, further comprising:
   a second hood mounted nozzle, wherein the first hood mounted nozzle and the second hood mounted nozzle are configured to sequentially project the wash fluid toward the windshield window during an up stroke and a down stroke of the wiper blade.

3. The windshield window wiping system according to claim 1, wherein the input to the first electronic circuit is a reference signal for a position of the wiper blade, provided by a wiper motor switch.

4. The windshield window wiping system according to claim 3, wherein
the wiper motor switch is a single limit switch.

5. The windshield window wiping system according to claim 1, wherein
the input to the first electronic circuit is a signal indicative of a pole switching of the wiper motor.

6. The windshield window wiping system according to claim 1, wherein
the input to the first electronic circuit is at least one selected from the group consisting of a signal indicative of a supply voltage of the wiper motor, and a signal indicative of a vehicle speed.

7. The windshield window wiping system according to claim 1, wherein
the first electronic circuit comprises a microprocessor.

8. The windshield window wiping system according to claim 1, wherein
the first electronic circuit is located in at least one selected from the group consisting of a wiper motor assembly, a wash pump motor assembly, and in a body control module (BCM).

9. The windshield window wiping system according to claim 1, wherein
the wash pump comprises a wash pump motor which is controlled by a second electronic circuit, the second electronic circuit is configured to dynamically adjust a pressure of the wash fluid by pulse-width modulation (PWM) of the wash pump motor during the wiper blade stroke.

10. The windshield window wiping system according to claim 9, wherein
a profile of the dynamically adjusted pressure is dependent on a vehicle speed.

11. The windshield window wiping system according to claim 1, further comprising:
a restriction valve for the wash fluid, wherein the first hood mounted nozzle is configured to project the wash fluid toward the windshield window at a lower pressure during an up stroke and at a higher pressure during a down stroke, wherein
the lower pressure of the wash fluid during the up stroke projects the wash fluid at a lower position onto the windshield than the projected position of the wash fluid on the windshield at higher pressure, and wherein
the restriction valve restricts a flow of the wash fluid during the projection of wash fluid toward the windshield window at lower pressure.

12. A windshield window wiping system, comprising:
a wiper blade in contact with a windshield window;
a wiper motor operatively connected to the wiper blade, configured to perform a wiper blade stroke;
a reservoir for a wash fluid;
a first hood mounted nozzle, configured to project the wash fluid toward the windshield window;
a wash pump, wherein the wash pump is hydraulically connected to the first hood mounted nozzle; and
a first electronic circuit, configured to estimate a position of the wiper blade during the wiper blade stroke based on an input to the first electronic circuit and to synchronize the projection of the wash fluid toward the windshield window with the estimated position of the wiper blade,
wherein the estimation of the position is based on a speed of the wiper motor, and
wherein the estimation is performed without measuring of a position of the wiper blade.

* * * * *